United States Patent
Campbell et al.

(10) Patent No.: US 11,053,422 B2
(45) Date of Patent: *Jul. 6, 2021

(54) CHAIN-REACTIVE HEAT-GENERATING MICROCAPSULES

(71) Applicant: International Business Machines Corporation, Armonk, NY (US)

(72) Inventors: Eric J. Campbell, Rochester, MN (US); Sarah K. Czaplewski, Rochester, MN (US); Joseph Kuczynski, North Port, FL (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 15/459,573

(22) Filed: Mar. 15, 2017

(65) Prior Publication Data

US 2018/0265428 A1  Sep. 20, 2018

(51) Int. Cl.
*C09K 5/18* (2006.01)
*B23B 5/16* (2006.01)
*C09K 8/588* (2006.01)

(52) U.S. Cl.
CPC .............. *C09K 5/18* (2013.01); *B23B 5/16* (2013.01); *C09K 8/588* (2013.01)

(58) Field of Classification Search
CPC .............. B23B 5/16; C09K 5/18; C09K 8/588
See application file for complete search history.

(56) References Cited

U.S. PATENT DOCUMENTS

| | | | |
|---|---|---|---|
| 6,235,394 B1 | 5/2001 | Shimazawa et al. | |
| 6,727,203 B2 | 4/2004 | Ichikawa | |
| 9,714,396 B2 | 7/2017 | Feng et al. | |
| 2009/0169630 A1* | 7/2009 | Ward | A01N 59/00 424/489 |
| 2013/0052452 A1* | 2/2013 | Lee | A62D 1/06 428/323 |
| 2015/0231589 A1 | 8/2015 | Arumugam et al. | |
| 2016/0151757 A1 | 6/2016 | Shih et al. | |
| 2016/0186044 A1 | 6/2016 | Rothrock et al. | |

* cited by examiner

*Primary Examiner* — Aileen B Felton
(74) *Attorney, Agent, or Firm* — Patterson + Sheridan, LLP (57) ABSTRACT

A chain-reactive, heat-generating microcapsule comprises a first compartment including a first component and a second compartment including a second component. An isolating structure separates the first and second compartments. The isolating structure may rupture when heated above a normal ambient temperature and/or in response to a compressive force. The first component reacts with the second component to produce heat. The microcapsule may further incorporate a blowing agent that responds to heating. In some embodiments, a core within the first compartment comprises a blowing agent material that responds to the heat produced when the first and second components react. The microcapsules can be incorporated into a material comprising a heat-curable resin precursor such that heat generated by the microcapsules can be used to cure the resin precursor.

19 Claims, 6 Drawing Sheets

CHAIN-REACTIVE HEAT-GENERATING MICROCAPSULES

BACKGROUND

The present disclosure concerns microcapsules which respond to external stimuli to produce heat.

Heat-generating microcapsules have many possible applications. For example, heat-generating microcapsules can be used to provide tamper resistant electronic components, self-curing adhesives, and self-healing composite components. In such applications, the microcapsules can be embedded in a resin material and external forces/stimuli cause the microcapsules to rupture, which in turn cause the microcapsules (or the contents of the microcapsule) to generate heat. The heat from the rupture of the microcapsules can be used to trigger a security response, cure a surrounding resin material, or cause a phase change in a surrounding material, and/or respond to damage a portion of a composite component. However, in general, only those microcapsules specifically subjected to the external force/stimuli are ruptured. Consequently, heat is generated only in a localized area corresponding to the place at which the external force/stimulus has been applied. In some applications, a localized response may be sufficient or even desirable, but in other applications it might be preferable for heat to be generated outside the local area receiving the force/stimulus. As such, a system incorporating chain-reactive heat-generating microcapsules would be desirable in some applications.

SUMMARY

According to one embodiment, a microcapsule comprises a first compartment including a first component, a second compartment including a second component, and an isolating structure separating the first and second compartments. The isolating structure ruptures when heated above a normal ambient operating temperature (e.g., 20-30° C.). The first component reacts with the second component to produce heat.

According to another embodiment, a microcapsule comprises a first compartment including a first component, a second compartment including a second component, an isolating structure separating the first and second compartments, and a core within the first compartment. The core comprising a blowing agent. The isolating structure ruptures when subjected to a compressive force. The first component reacts with the second component to produce heat. The blowing agent responds to the heat produced when the first and second components react.

According to still another embodiment, a material comprises a heat-curable resin precursor and a plurality of chain-reactive, heat-generating microcapsules.

DETAILED DESCRIPTION

Various microcapsules that generate heat in response to a specific stimulus event are available. In particular, a shell-in-shell or multi-compartment microcapsule architecture in which exothermically reacting materials are separated by an internal barrier designed to rupture in response to physical forces can be used to generate heat. With these types of microcapsules, the internal barrier ruptures in any microcapsule exposed to sufficient external force, which allows the initially separated reactants in these microcapsules to mix and react and produce heat. However, in general, with these types of microcapsules, only those microcapsules directly exposed to the external force will rupture/respond to the force. Consequently, heat is produced only at the location at which the force is applied and the total amount of heat generated might spatially localized and/or relatively inconsequential. As discussed further below, chain-reactive, heat-generating microcapsules according to the present disclosure can be used to amplify otherwise localized stimulus events and increase the response to stimulus events.

FIG. 1 depicts chain-reactive, heat-generating microcapsules 130 disposed within a matrix material 120. The distribution of microcapsules 130 in matrix material 120 in FIG. 1 is presented in a simplified manner for purposes of explanation. In general, the distribution of microcapsules 130 may be statistically homogenous, but it is not required that microcapsule 130 distribution be uniform for any given unit volume of matrix material 120. Furthermore, the distribution of microcapsules 130 within matrix material 120 may be inhomogeneous, either purposively or inadvertently. For example, a concentration of microcapsules 130 in matrix material 120 may be purposively increased during fabrication by direct injection of microcapsules 130 into matrix material 120 (or a precursor to matrix material 120) at sites at which it might be considered particularly important to provide microcapsules 130 (for example, at locations considered particularly vulnerable to physical tampering when these microcapsules 130 are incorporated into a device designed to respond to physical tampering events).

The depiction of relative sizes of each microcapsule 130 is not intended to be to scale with respect to thickness of matrix material 120 (or any other dimension). As an example, microcapsules 130 may have about a 10 μm outer diameter and the matrix material 120 may be a resin film having a thickness of about 1000 μm or more. FIG. 1 depicts each microcapsule 130 as a spheroid having a same diameter. However, uniform shape and size of microcapsules 130 is not a requirement and microcapsules 130 having different shapes and dimensions may be included in matrix material 120.

Microcapsules 130 may be referred to as multi-compartment microcapsules. Each microcapsule 130 includes at least two components (first component 132 and second component 134) separated by a rupturable barrier (see FIGS. 2A-2D). The barrier can be designed to rupture in response to a stimulus. For example, the barrier may be designed to rupture under a particular force, such a compressive force or other forces. In some embodiments, the stimulus may be heating sufficient to initiate a reaction in the microcapsule 130. As described further below, such stimulating heating can be supplied from an external source/event and/or by the rupturing in neighboring microcapsules 130.

The first component 132 and second component 134 undergo an exothermic reaction when mixed or otherwise placed in direct contact with each other. That is, in an initial state, the first component 132 and second component 134 are separated from each other by a barrier within the microcapsule 130. This barrier is designed to rupture in response to heating events and/or the application of external forces so as to allow the first component 132 and the second component 134 to contact each other and react to generate heat in response to such heating or applications of force, which in turn will cause the temperature of the matrix material 120 to increase (at least in some localized area). That is, when resin matrix 110 is physically probed or otherwise subjected to force, the internal barriers (133/137/139) in some portion of the microcapsules 130 rupture in response.

As depicted in FIGS. 1A-1D, the microcapsules 130 in region 100a (primary stimulus region) are each ruptured by an external stimulus. Region 100a is an arbitrary portion of resin matrix 110 and may be positioned anywhere within the resin matrix 110 and be of any size or shape corresponding to the application of the external stimulus. Region 100a may be referred to as the primary stimulus region 100a in this context.

The microcapsules 130 in region 100b (secondary stimulus region) will not be (directly) ruptured by the external stimulus. Region 100b is adjacent to region 100a, but is otherwise an arbitrary portion of the resin matrix 110. Region 100b may be referred to as a secondary stimulus region 100b in this context. Region 100b may be considered to encompass all portions of the resin matrix 110 other than the portion encompassed by region 100a, but such is not specifically required and resin matrix 110 may also include portions not included within either region 100a or region 100b.

Figure 1A:
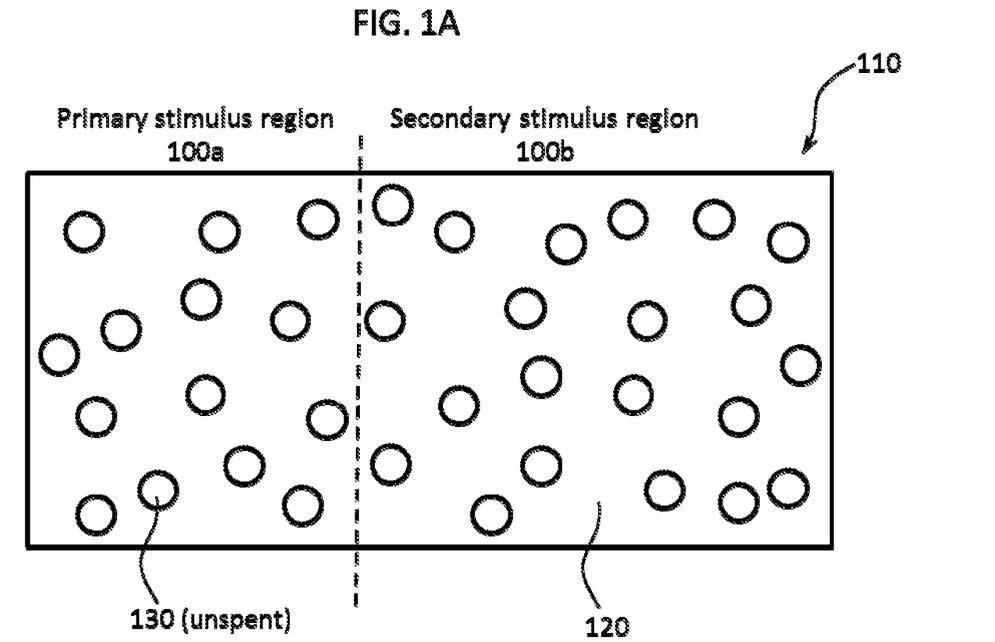
FIGS. 1A-D depict a resin material including a heat-generating microcapsule having chain-reactive aspects according to an embodiment. Each of FIG. 1A to 1D depicts a different stage in the amplification of a localized stimulus event in the resin material.

FIG. 1A depicts the resin matrix 110 in a state just before the application of an external stimulus. The microcapsules 130 are dispersed in a resin material 120. FIG. 1A depicts each microcapsule 130 as intact (unspent).

Figure 1B:
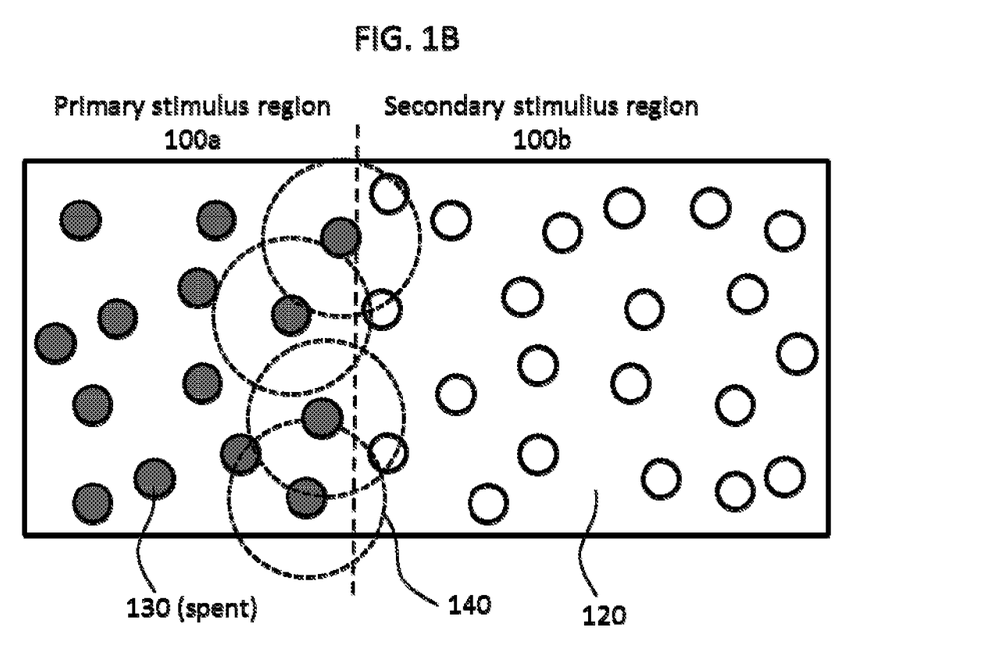

FIG. 1B depicts the resin matrix 110 in a state just after the application of the external stimulus to the primary stimuli region 100a. Each microcapsule 130 in region 100a has had an internal barrier ruptured by the external stimulus. The rupturing of the internal barrier allows the first component 132 and the second component 134 in those microcapsules to react. This reaction generates heat that increases the local temperature in the resin matrix 110 at sites near the ruptured (spent) microcapsules 130 (depicted as shaded circles).

FIG. 1B depicts certain spent microcapsules 130 with a surrounding influence zone 140. This influence zone 140 represents the extent of a secondary stimulus provided by the ruptured microcapsules 130. Each ruptured microcapsule 130 may be considered to have an influence zone 140 surrounding it, but, for purposes of graphical clarity, only those the influence zones of particularly relevant microcapsules 130 (i.e., those proximate to the border between region 100a and region 100b) are depicted. Additionally, the depiction of individualized influence zones 140 is for conceptual simplicity. In reality, influence from several rupturing microcapsules 130 might combine in a complex manner not necessarily easily attributable in any specific microcapsule 130.

Figure 1C:
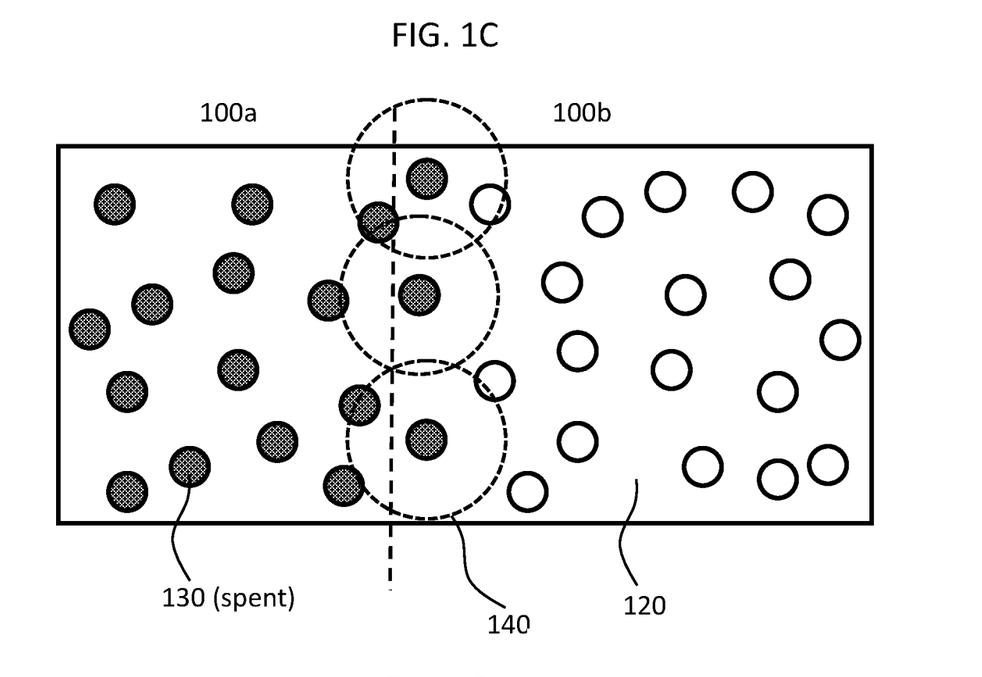

FIG. 1C depicts the resin matrix 110 as the rupturing of microcapsules 130 disposed within region 100b begins. These rupturing microcapsules 130 (each depicted with a surrounding influence zone 140) were within at least one of the influence zones 140 depicted in FIG. 1B. The secondary stimulus (corresponding in extent with the influence zones 140 depicted in FIG. 1B) caused by the rupturing of microcapsules 130 in region 100a is sufficient to cause at least some microcapsules 130 in region 100b to rupture.

Figure 1D:
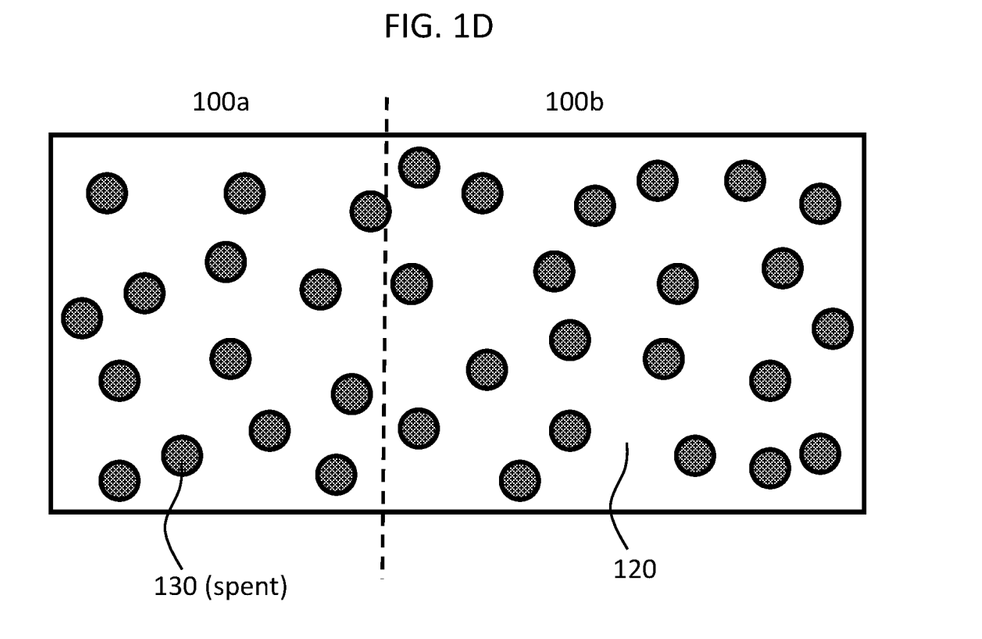

FIG. 1D depicts the resin matrix 110 after sufficient time has passed to permit chain-reactive rupturing of each microcapsule 130 in region 100b. That is, as shown in FIG. 1C, each time a microcapsule 130 ruptures (whether caused by direct external stimulus or an indirect stimulus provided by the rupturing of an adjacent microcapsule 130), it provides sufficient stimulus to rupture any other microcapsule 130 in sufficiently close proximity (i.e., within an influence zone 140). In turn, any newly ruptured microcapsule(s) 130 cause any other nearby microcapsule(s) 130 to rupture. Thus, it is possible for each microcapsule 130 in resin matrix 110 to rupture whether or not the microcapsule was ruptured directly by the external stimulus supplied to region 100a.

In general, the first component 132 and the second component 134 can be any two materials which react exothermically with each other. In a particular example, the first component 132 comprises iron (Fe) and the second component 134 comprises hydrogen peroxide ($H_2O_2$). Other embodiments may incorporate different or additional reactive components in distinct compartments within the microcapsule 130 or mixed inside compartments with first component 132 or second component 134. For example, the first component 132 may be an iron powder mixed with ferric nitrate ($Fe(NO_3)_3$) and the second component 134 may be hydrogen peroxide. Alternatively, the first component 132 may be hydrogen peroxide and the second component 134 may be iron powder mixed with ferric nitrate.

The relative volumes/amounts of the components in microcapsule 130 may be set such that each microcapsule 130 includes a stoichiometric amount of reactants, or an excess of any reactant may be provided. Various catalytic materials may be incorporated into microcapsule 130 along with the first component 132 and the second component 134. And as further discussed, microcapsules 130 are not necessarily limited to only two compartments and two reactive components.

Example Microcapsules

Figure 2A:
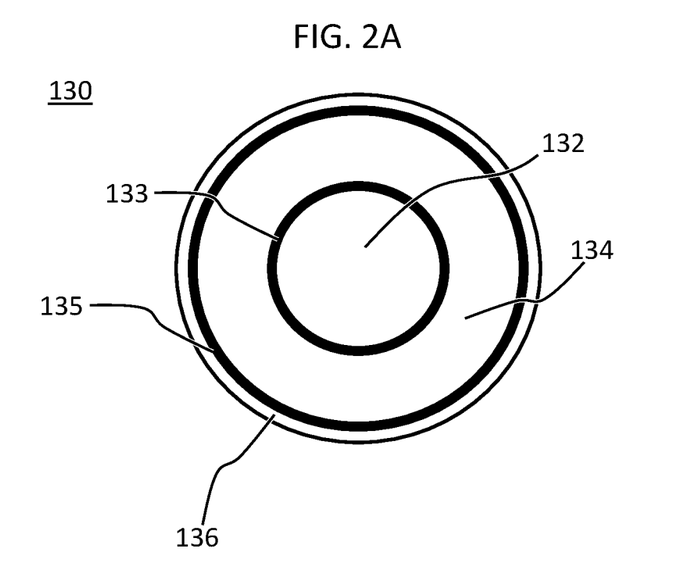
FIGS. 2A-2D depict various heat-generating microcapsules.

FIG. 2A depicts a particular example of an internal structure of a microcapsule 130. The depicted microcapsule 130 of FIG. 2A may be referred to as a multi-compartment microcapsule having a shell-in-shell architecture. In the microcapsule 130 of FIG. 2A, compartments for first component 132 and second component 134 are provided by an inner shell 133 contained within an outer shell 135. FIG. 2A is cross-sectional and the microcapsule 130 may be a spheroid or ovoid. The inner shell 133 may be designed to rupture under a particular compressive force. The outer shell 135 may be designed to rupture under the same force as the inner shell 133 or a different force. A coating 136 can be provided on the outer shell 135. The coating 136 is optional and can be included, for example, to promote adhesion and/or miscibility between microcapsule 130 and the matrix material 120. Additional compartments/shells may be provided, such that, for example, a plurality of inner shells 133 may be provided in a nested arrangement with additional components included within the additional compartments thus formed.

Figure 2B:
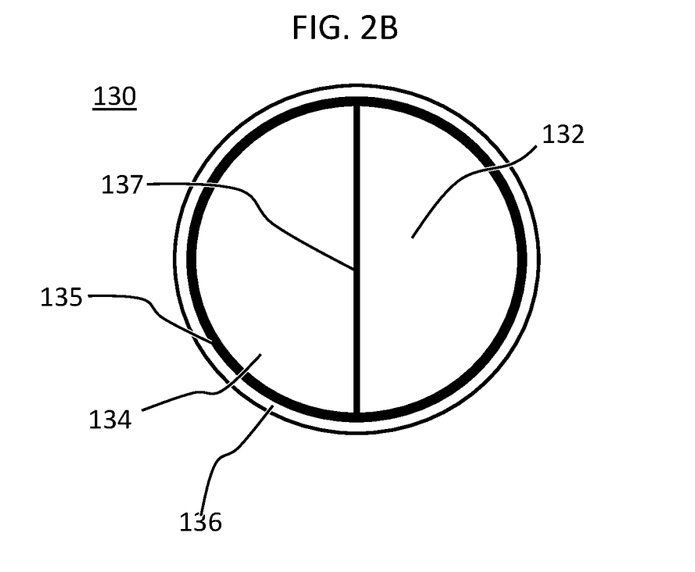

FIG. 2B depicts another particular example of an internal structure of a microcapsule 130. The depicted microcapsule 130 may be referred to as a multi-compartment microcapsule. In the microcapsule 130 of FIG. 2B, the compartments for first component 132 and second component 134 are formed by an inner membrane 137 contained within outer shell 135. FIG. 2B is cross-sectional and the microcapsule 130 may be spheroid or ovoid. The inner membrane 137 may be designed to rupture under a particular compressive force or in response to or stimuli, such as temperature increases. The outer shell 135 may be designed to rupture under the same force(s) as the inner membrane 137 or a different force. A coating 136 can be provided on the outer shell 135, but this may be optional in some embodiments.

Figure 2C:
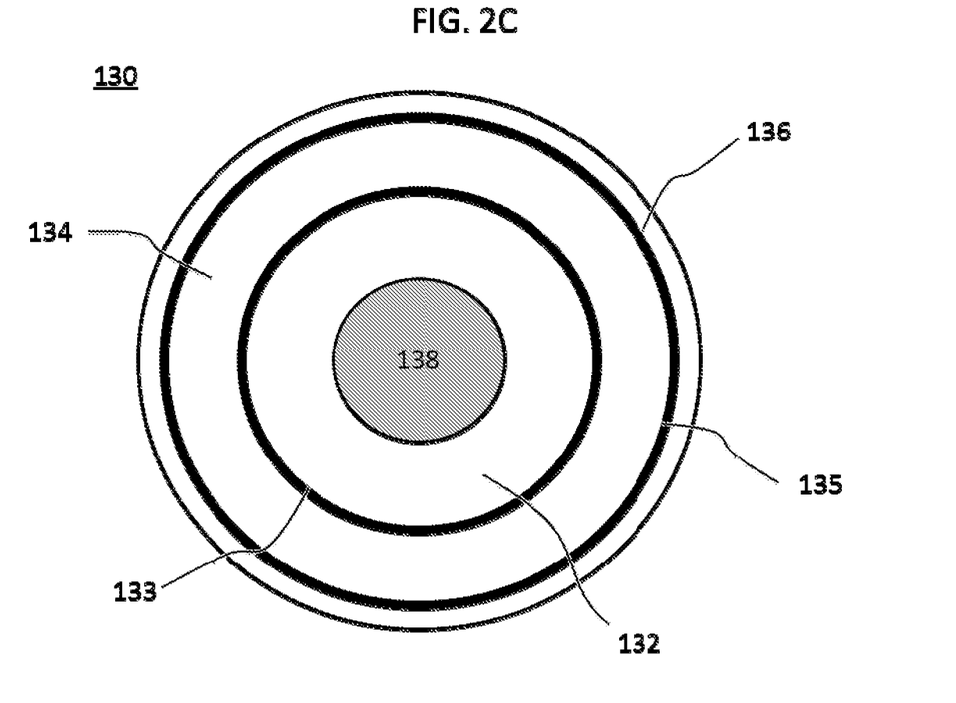

FIG. 2C depicts another particular example of an internal structure of a microcapsule 130. The depicted microcapsule 130 incorporates a third component 138 as a core surrounded by first component 132 and inner shell 133. First component 132 is separated from the second component 134 by the inner shell 133. The outer shell 135 surrounds the core formed by the third component 138 and the inner shell 133 containing the first component 132. As before, inner shell 133 may be designed to rupture under a particular compressive force or other stimuli. The outer shell 135 may be designed to rupture under the same force as the inner shell 133 or a different force. A coating 136 can also be provided on the outer shell 135.

Additional compartments/shells may be provided in some embodiments, such that, for example, a plurality of inner shells 133 may be provided in a nested arrangement around the third component 138 with additional components included within the additional nested compartments thus formed.

In the microcapsule 130 depicted in the FIG. 2C, the third component 138 may be referred to as a "blowing agent." In this context, a blowing agent is a material that when subjected to a temperature above a threshold temperature undergoes a chemical or physical reaction which causes the outer shell 135 to rupture. The temperature increase activating the blowing agent may result when inner shell 133 ruptures under an outside force allowing the first component 132 and the second component 134 to mix and react. The blowing agent 138 might be a material that reacts with other components in the microcapsule 130 to give off a gas such as nitrogen or carbon dioxide. The blowing agent 138 might be a material that expands with heat, a low boiling liquid, or a sublimating solid that converts to gas upon heating, such as the heating associated with the reaction of the first component 132 and the second component 134. Chemical blowing agents can be categorized as either endothermic or exothermic, which refers to the type of decomposition they undergo. Endothermic types absorb energy and typically release carbon dioxide and moisture upon decomposition, while exothermic release energy and usually generate nitrogen when decomposed. Examples of endothermic chemical blowing agents include isocyanate and water, sodium bicarbonate, Examples of exothermic chemical blowing agents include hydrazine, azodicarbonamide, or other nitrogen based compounds. Examples of physical blowing agents include hydrofluorocarbons (HFCs), hydrofluoroolefins (HFOs), and hydrocarbons such as pentanes.

Incorporation of the third component 138 in this manner provides a specific mechanism to spatially amplify otherwise local effects by a chain-type reaction process. That is, the rupture of the inner shell 133 in a relatively few microcapsules 130 in one region (e.g., region 100*a*) within resin matrix 110 could, by control of microcapsule 130 loadings and composition, allow the effect of a local rupturing event to spread to adjacent microcapsules 130 and thus further increase the temperature of resin material 120.

For example, without being limited to any particular mechanism of the chain-type amplification process, in some embodiments, when an external stimulus event causes the rupture of an inner shell 133 in one microcapsule 130 in one location in resin matrix 110, the rupturing in this one microcapsule will allow the first component 132 and the second component 134 therein to react and generate heat. The generated heat triggers the response of the third component 138 within this ruptured microcapsule 130. This generated heat would also spread to neighboring, un-ruptured microcapsules 130 and can, by design, be sufficient to trigger a response of the third component 138 within the neighboring microcapsules 130. The third component 138 in these neighboring microcapsules 130 is triggered by the heat produced by the initial microcapsule 130 rupturing to sublime, generate gas, or otherwise increase internal pressure within the microcapsule. In general, the response attendant to the change in state of the third component 138 can rupture the inner shell 133 in these neighboring microcapsules 130 and thus allow the mixing and reaction of the first component 132 and second component 134 to produce heat. The generation of heat in these neighboring microcapsules 130 can in turn can cause a similar heat-induced triggering process in other adjacent microcapsules 130.

Another possible mechanism for a chain-type amplification process, in some embodiments, would be the response of the third component 138 within a microcapsule 130 in one area of a resin matrix 110 being sufficient, by design, to cause a local increase stress in the matrix material 120 that could cause the rupturing of an inner shell 133 of a nearby microcapsule 130. The rupturing of inner shell 133 in the nearby microcapsule 130 would permit reaction between the first component 132 and the second component 134 in the nearby microcapsule 130, which in turn would cause the third component 138 of that microcapsule to react, which in turn might cause the inner shell 133 of another nearby microcapsule 130 to rupture, and so forth.

Figure 2D:
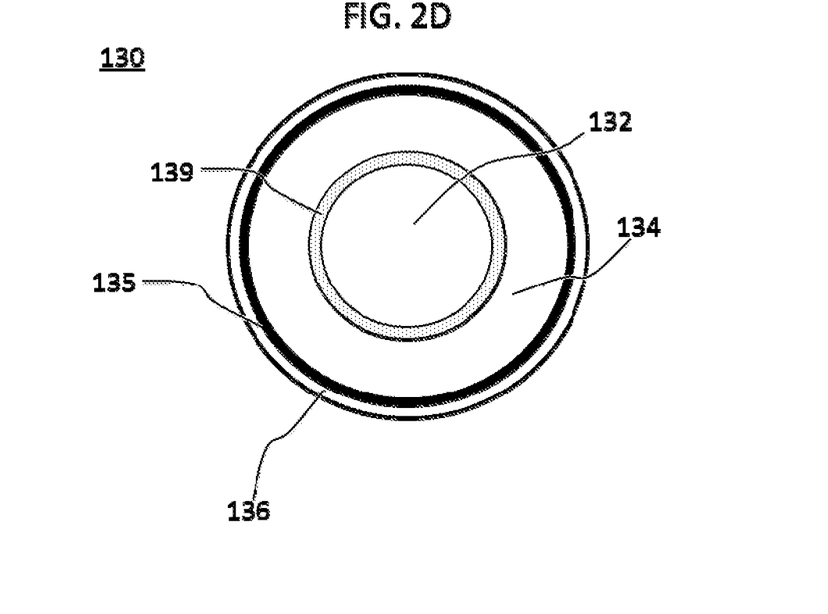

FIG. 2D depicts another particular example of an internal structure of a microcapsule 130. The depicted microcapsule 130 incorporates a thermally active inner shell 139 instead of an inner shell 133, but is otherwise similar to the microcapsule 130 depicted in FIG. 2A. Thermally active inner shell 139 can also be designed to rupture in response to a compressive force. A thermally active inner shell 139 may respond to temperature increases by melting, undergoing a phase change, or decomposing. For example, N-isopropylacrylamide (NIPA) contracts upon heating and this response can be used to initiate thermal release. NIPA microcapsule shells can also rupture from increased internal pressure caused by contraction.

The inner shell 139 can also be made of a polymeric material that has a melting point in the desired temperature response range. For example, the inner shell 139 might preferably be stable in normal ambient temperature range, say 20-30° C., but rupture with heating from a neighboring microcapsule 130. Therefore, a polymeric inner shell 139 that melts at 60-80° C. could be appropriate. Polymers that fit this description include polycaprolactone and isotactic polypropylene oxide. However, different polymers with the appropriate melting point can be selected according to the intended application.

As noted, thermally responsive inner shell 139 is sensitive to temperature increases, such as might result from rupturing of adjacent or nearby microcapsules 130. Thus, while some microcapsules 130, as depicted in FIG. 2D, might rupture by external stimulus (external heating or applied force), others might be ruptured by a temperature increase caused by the rupture of other microcapsules 130. That is, above a particular temperature, the thermally responsive inner shell 139 ruptures or otherwise decomposes to allow the first component 132 and the second component 134 to mix/react and such a response is generally independent of the manner in which the temperature increase has been caused.

As noted, the reaction of these two components (132 and 134) is exothermic, which causes the local temperature in resin material 120 to increase. Thus, the thermally responsive inner shell 139 in nearby microcapsules 130 may likewise breakdown or otherwise rupture in response to the local temperature increase caused by reactions of other microcapsules 130.

Incorporation of the thermally responsive inner shell 139 in this manner provides a mechanism to spatially amplify local thermal effects by a chain reaction process. That is, rupture of a thermally response inner shell 139 in a relatively few microcapsules 130 in one location within resin matrix 110 could, by control of microcapsule 130 loadings and compositions, permit the heat generated by relatively few microcapsules 130 to spread to adjacent or other microcapsules 130 to more substantially increase the temperature of the resin matrix 110 and/or cause a wider spatial response to an otherwise local event.

Such a microcapsule 130 as depicted in FIG. 2D might be used to cause the curing of a heat curable resin material 120 even in regions not directly or easily accessible by an external heating source. Thus, through-component curing could be provided even when regions of the resin material are, for example, are blocked from an external light source or heat lamp or the like. Likewise, thicker resin layers and/or opaque resin layers might be cured than would otherwise be the case with a UV curing resin material.

Figure 3:
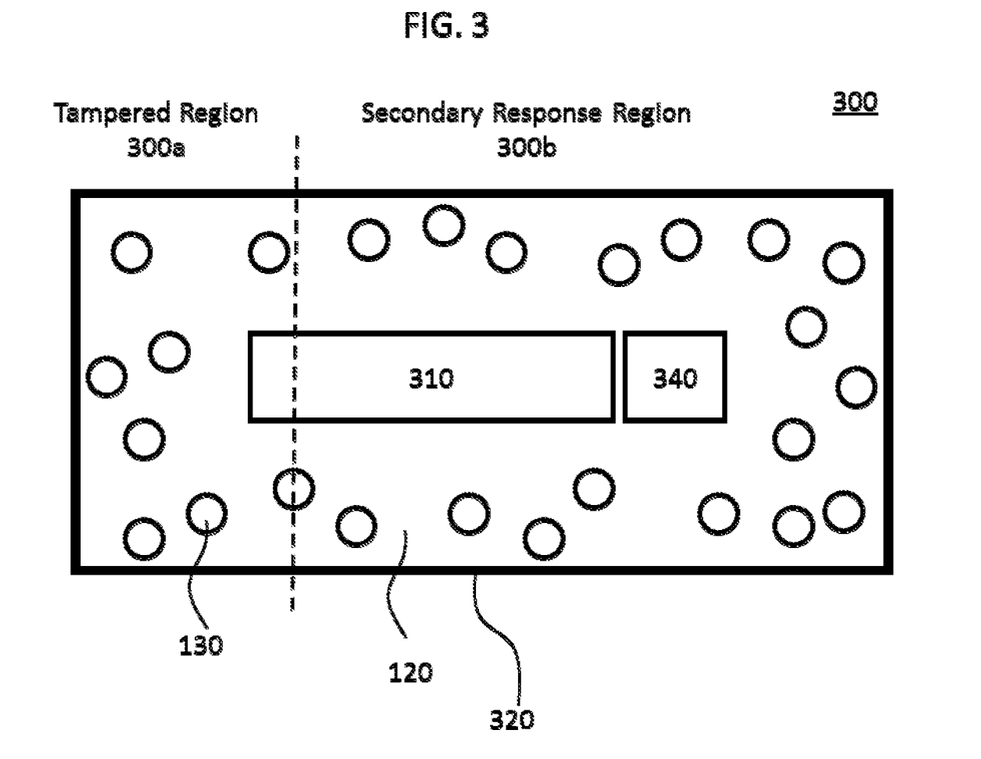
FIG. 3 depicts aspects of secured device incorporating chain-reactive microcapsules in a matrix material utilizing heat.

There is no requirement that only one type of microcapsule 130 be incorporated in a resin material 120. In general, any combination of different types of microcapsules 130 described above may be incorporated in to the resin material Example Applications Computing systems include electronic components such as security devices and cryptographic modules to prevent data theft and the like. These devices and modules provide data security in personal computing systems and high-end network servers. These devices and modules are, for example, implemented as a device card or on a printed circuit board. To meet industry accepted standards for protection, these devices and modules must incorporate features and mechanisms that provide physical security for internal device components such that physical attempts to access or tap internal components can be detected and/or responded to in a manner that resists tampering and/or unauthorized access of data FIG. 3 depicts a secured device 300 including an internal component 310 and a casing 320 surrounding the internal component 310. The secured device 300 may be, without limitation, a circuit board, a packaged integrated circuit, a microchip, a microprocessor, an electronic card device, a cartridge device, a cryptographic module, or combinations of these elements. The internal component 310 may be, without limitation, a circuit board, an integrated circuit, a packaged integrated circuit, a microchip, a microprocessor, an electronic card device, a cartridge device, a cryptographic module, or combinations of these elements. Additionally, while a single internal component 310 is depicted in the secured device 300 of FIG. 3, a plurality of internal components 310 may be provided within casing 320. Internal component 310 may also include a power source such as a battery.

Casing 320 is depicted in FIG. 3 as completely encasing or surrounding internal component 310 and while this might be a preferred arrangement from the standpoint of physical security, various portions of the internal component 310 might be left uncovered as needed for mounting or connecting the secured device 300 within a computing system. For example, various terminals, leads, contacts, or wires might be left exposed by, or allowed to protrude from, casing 320.

As depicted in FIG. 3, security device 300 includes microcapsules 130 dispersed in a resin material 120 in a manner similar depicted in FIG. 1A. Some materials used in forming matrix material 120 may be applied as a liquid, and then subsequently cured to a solid state by thermal, photo, or other processing. Microcapsules 130 may be incorporated into the liquid precursor of the matrix material 120 for purposes of application. The matrix material 120 may further include various fillers and/or colorants, though these are not necessarily required.

Other types of layers may be included in or on security device 300 for various purposes, such as structural stability, chemical resistance, or tampering prevention or the like. Such additional layers may be laminated (or otherwise mounted) on or incorporated in casing 320. For example, metal layers, radiation blocking layers, or the like might be included in or in security device 300. Similarly, metal meshes may be embedded in or laminated on matrix material 120 for various purposes.

In this example, security device 300 includes a heat sensor 340. Heat sensor 340 is used to monitor the temperature within casing 320. Heat sensor 340 may be, for example, a thermocouple, thermistor, a silicon bandgap temperature sensor or the like. While only one heat sensor 340 is depicted in FIG. 3, a plurality of heat sensors 340 may be incorporated into secured device 300.

Here, heat sensor 340 is used to detect a temperature rise (or change) associated with a tampering event in one region (300a) of security device 300 and to trigger a security response, such as shutdown of internal component 310. In this context, "security response" includes any actions to prevent or limit access to a component within casing 320, and without limitation, may include: shutdown of an internal component or a portion thereof, transmitting an alarm signal to an internal component, transmitting an alarm signal to an external component, sounding an audible alarm, triggering a visual alarm, rendering an internal component inoperable, physical destruction of an internal component or a portion thereof, erasure of electronically stored data, encrypting internal data, overwriting stored data with dummy data, or the like.

As explained in conjunction with FIG. 1A-1D, tampering events that cause the rupture of microcapsules 130 in tampered region 300a can ultimately cause the rupturing of microcapsules 130 in secondary response region 300b outside of the tampered region 300a by a chain-type response of adjacent microcapsules 130 beyond the local site of the tampering event. Here, the tampering event may be drilling, probing, local heating, or the like. The spatial amplification of the local tampering event may permit, for example, fewer heat sensors 340 to be incorporated into security device 300.

Figure 4:
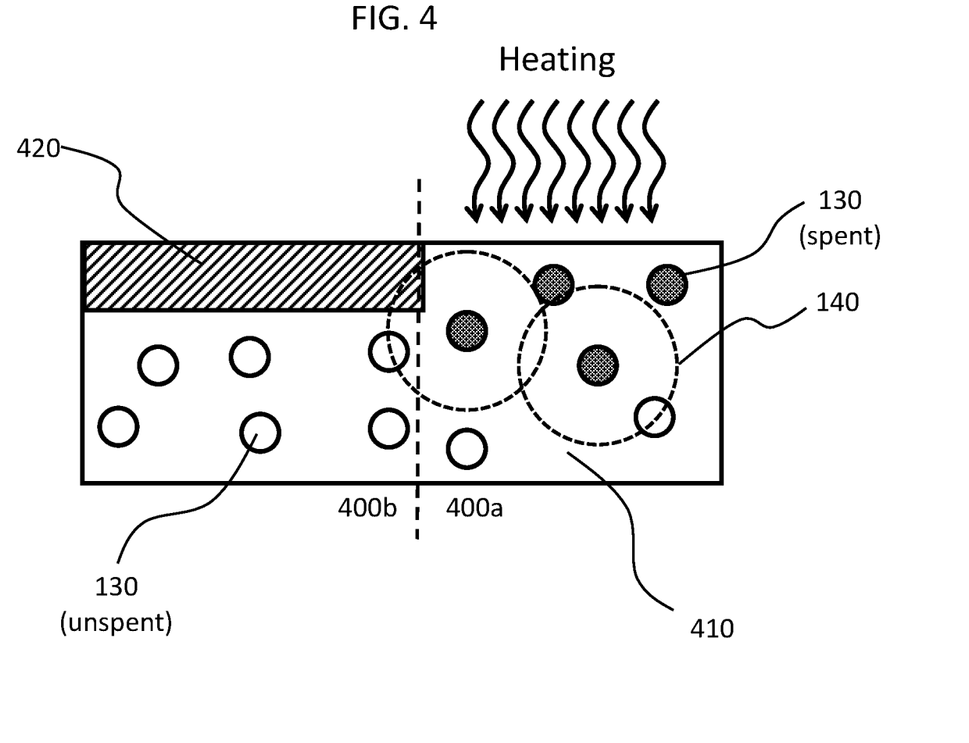
FIG. 4 depicts aspects of an application of chain-reactive, heat-generating microcapsules involving heat curing or curable resins or resin precursors.

FIG. 4 depicts the use of chain-reactive heat-generating microcapsules 130 in the thermal curing of a resin precursor material 410. For example, resin precursor material 410 may be liquid or gel-like material that cures to a solid material when heated. Resin precursor material 410 may be used to form a coating, an adhesive, or a binding resin material. For example, resin precursor material 410 may be heat-curable oligomeric or monomeric material. As depicted in FIG. 4, a component 420 blocks some portion of resin precursor material 410 from direct heating. Component 420 may be, for example, a carbon fiber, a carbon fabric, or a structural element on which the resin precursor material 410 is to be bonded, cured, or adhered. A region 400b is blocked from direct heating by the component 420. A region 400a is not blocked from direct heating; however, some portion (the lower portion as depicted in FIG. 4) of region 400a may be relatively distance from the heating and not easily cured.

In a manner similar to the process depicted in FIG. 1A-1D, the microcapsules 130 exposed to the heating rupture, then in turn generate heat and/or force (depicted as an influence zone 140) that is sufficient to cause nearby microcapsules 130 to rupture. Heat from the spent microcapsules 130 also promotes the curing of resin precursor material 410. By a chain-reactive process, even microcapsules 130 distance from or blocked from the heating source can eventually be ruptured and the entirety of resin precursor 410 can be cured. Thus, thick films of resin precursor 410 and/or deeply embedded portions (e.g., within a deep or blind structural joint) of resin precursor 410 can be cured by the heat generated by microcapsules 130.

Fabrication of Microcapsules

Microcapsules 130 may, in general, be prepared according to methods disclosed in U.S. patent application Ser. No. 14/937,983, the entire contents of which are incorporated herein by reference. In one possible method, microcapsules 130 can be prepared by preparing spherical calcium carbonate microparticles in which finely powdered iron (Fe) and magnetite ($Fe_3O_4$) are immobilized by co-precipitation. Optionally a catalyst such as ferric nitrate may be included in the calcium carbonate microparticles. For example, 1M $CaCl_2$ (0.615 mL), 1M $Na_2CO_3$ (0.615 mL), 1.4% (w/v) magnetite nanoparticle suspension (50 μL) and deionized water (2.450 mL) containing finely powdered iron (2 mg) and, optionally, $Fe(NO_3)_3$ (0.01 mg) may be mixed and thoroughly agitated on a magnetic stirrer for 20 s at room temperature. After the agitation, the precipitate may be separated from the supernatant by centrifugation and washed three times with water. The diameter of the $CaCO_3$ microparticles produced by a reaction time of 20 s is 4-6 μm. Smaller $CaCO_3$ microparticles are produced if the reaction time is reduced. Other metals may be used in lieu of, or in addition to, the powdered iron. For example, magnesium or magnesium-iron alloy may also be used.

Other magnetic nanoparticles may be used in lieu of, or in addition to, the magnetite. For example, cobalt ferrite nanoparticles may also be used. As noted above, the iron powder may be mixed with a catalyst such as ferric nitrate, which when in contact with hydrogen peroxide (to be encapsulated in the outer shell in this example) liberates oxygen, which reacts exothermically with the iron powder. Other catalysts may be used in lieu of, or in addition to, the ferric nitrate. For example, sodium iodide (NaI) may also be used.

In this example, the fabrication of microcapsules is based on the layer-by-layer (LbL) self-assembly of polyelectrolyte thin films. Such polyelectrolyte capsules are fabricated by the consecutive adsorption of alternating layers of positively and negatively charged polyelectrolytes onto sacrificial colloidal templates. Calcium carbonate is but one example of a sacrificial colloidal template. One skilled in the art will appreciate that other templates may be used in lieu of, or in addition to, calcium carbonate. For example, polyelectrolyte capsules may be templated on melamine formaldehyde and silica. In the present example, the $CaCO_3$ microparticles are LbL coated to form a polyelectrolyte multilayer (PEM) build-up by adsorbing five bilayers of negative PSS (poly (sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. The $CaCO_3$ microparticles may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolytes may be repeated five times and, consequently, five PSS/PAH bilayers are deposited on the surface of the $CaCO_3$ microparticles. The thickness of this "inner shell" polyelectrolyte multilayer may be varied by changing the number of bilayers. Other polyelectrolyte multilayers and other coatings may be used in lieu of, or in addition to, the PSS/PAH-multilayer. For example, coating polyelectrolyte multilayer capsules with lipids can result in a significant reduction of the capsule wall permeability.

To prepare ball-in-ball calcium carbonate microparticles in which a second material such as hydrogen peroxide is immobilized in a second compartment, a polyelectrolyte multilayer that is sandwiched between two calcium carbonate compartments is formed by another co-precipitation process. To this end, the polymer-coated $CaCO_3$ microparticles may be re-suspended in 1M $CaCl_2$ (0.615 mL), 1M $Na_2CO_3$ (0.615 mL), and deionized water (2.500 mL) containing hydrogen peroxide (1 mg), rapidly mixed and thoroughly agitated on a magnetic stirrer for 20 s at room temperature. After the agitation, the precipitate may be separated from the supernatant by centrifugation and washed three times with water. The second co-precipitation may be accompanied by formation of a coproduct, i.e., single core $CaCO_3$ microparticles that contain only hydrogen peroxide. Hence, the resulting precipitate represents a mixture of ball-in-ball $CaCO_3$ microparticles and single core $CaCO_3$ microparticles. The ball-in-ball $CaCO_3$ microparticles are, however, magnetic due to the immobilized magnetite nanoparticles in the inner compartment, and thus may be isolated by applying an external magnetic field to the sample while nonmagnetic single core $CaCO_3$ microparticles are removed by a few washing steps.

Another LbL coating is formed on the ball-in-ball $CaCO_3$ microparticles by a polyelectrolyte multilayer (PEM) build-up with five bilayers of negative PSS (poly(sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. For example, the ball-in-ball $CaCO_3$ microparticles may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolyte may be repeated five times and, consequently, five PSS/PAH bilayers are deposited on the surface of the ball-in-ball $CaCO_3$ microparticles.

The $CaCO_3$ core of the ball-in-ball $CaCO_3$ microparticles may be removed by complexation with ethylenediaminetetraacetic acid (EDTA) (0.2 M, pH 7.5) leading to formation of shell-in-shell microcapsules. For example, the ball-in-ball $CaCO_3$ microparticles may be dispersed in 10 mL of the EDTA solution (0.2 M, pH 7.5) and shaken for 4 h, followed by centrifugation and re-dispersion in fresh EDTA solution. This core-removing process may be repeated several times if necessary to completely remove the CaCO₃ core. The diameter of the resulting shell-in-shell microcapsules ranges from 8-10 μm with an inner core diameter of 3-5 μm.

A multi-compartment microcapsule for heat generation in accordance with some embodiments of the present disclosure may be produced by other conventional multi-compartment capsule fabrication processes, such as use of polymeric micelles, hybrid polymer microspheres, and two-compartment vesicles. In some instances, the LbL process may begin from an established core or template particle incorporating a blowing agent material.

The descriptions of the various embodiments of the present disclosure have been presented for purposes of illustration, but are not intended to be exhaustive or limit the disclosure to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A microcapsule, comprising:
a first compartment including a first component;
a second compartment including a second component; and
a heat activated isolating structure separating the first and second compartments, wherein the isolating structure comprises a material with a melting point of 60° C. to 80° C.

2. The microcapsule of claim 1, wherein the microcapsule is a shell-in-shell microcapsule and the isolating structure is an inner shell surrounding the first compartment.

3. The microcapsule of claim 2, further comprising:
a core within the inner shell, wherein the core comprises a blowing agent.

4. The microcapsule of claim 3, wherein the blowing agent is a chemical blowing agent.

5. The microcapsule of claim 1, wherein the first component is a metal and the second component is an oxidizer.

6. The microcapsule of claim 1, wherein the isolating structure is a polymeric material.

7. The microcapsule of claim 1, wherein the isolating structure comprises polycaprolactone.

8. The microcapsule of claim 1, wherein the isolating structure ruptures in response to compressive forces.

9. A microcapsule, comprising:
an outer shell;
a first compartment within the outer shell including a first component, the first component comprising iron;
a second compartment within the outer shell including a second component;
a compressive force activated isolating structure within the outer shell separating the first and second compartments; and
a third compartment surrounded by the first compartment, the third compartment comprising a blowing agent.

10. The microcapsule of claim 9, wherein the blowing agent is a chemical blowing agent.

11. The microcapsule of claim 9, wherein the first component is a metal and the second component is an oxidizer.

12. The microcapsule of claim 9, wherein the blowing agent is a liquid.

13. The microcapsule of claim 9, wherein the blowing agent comprises a nitrogen containing compound.

14. A microcapsule, comprising:
a first compartment including a first component mixed with a catalyst, wherein the first component is a metal;
a second compartment including a second component;
a heat activated isolating structure separating the first and second compartments; and
a core within the first compartment, the core comprising a chemical blowing agent, the chemical blowing agent comprising a nitrogen containing compound.

15. The microcapsule of claim 14, wherein the second component is an oxidizer.

16. The microcapsule of claim 15, wherein the second component is hydrogen peroxide.

17. The microcapsule of claim 9, wherein the isolating structure is a polymeric material.

18. The microcapsule of claim 9, further comprising a coating on the outer shell.

19. The microcapsule of claim 14, wherein the isolating structure has a material with a melting point of 60° C. to 80° C.

* * * * *